May 6, 1969  W. R. TERNES  3,442,275

COMBINATION UTILITY DEVICE FOR HUNTERS

Filed Sept. 21, 1967

INVENTOR.
Wayne R. Ternes

3,442,275
COMBINATION UTILITY DEVICE FOR HUNTERS
Wayne R. Ternes, Minneapolis, Minn.
(3501 Claudette Drive, Sioux Falls, S. Dak. 57103)
Filed Sept. 21, 1967, Ser. No. 669,422
Int. Cl. E04f *10/02*
U.S. Cl. 135—5      1 Claim

ABSTRACT OF THE DISCLOSURE

A combination device for use by hunters which serves as a windbreaker, a signal to other hunters, is a hiding device for bow hunters when colored to resemble land, serves as a wrap-around raincoat, a waterproof wrapping device, a distress signal when laid flat, and it may also be used as an emergency skidding device for bringing a wounded hunter from the woods or a dead animal, etc. This device is made of a bright orange, lightweight nylon material and has a plurality of elastic loops spaced apart on the ends which may be stretched to engage with any of a plurality of hook members secured to the webbed surface and lends itself to be secured between trees.

---

This invention relates to utility devices, and more particularly to a utility device for use by hunters and the like.

It is therefore the main purpose of this invention to provide a combination utility device for hunters which will be of a rectangular flat shape and will be made of a lightweight nylon material which may be stretched between trees to serve as a windbreaker or lean-to.

Another object of this invention is to provide a combination utility device which will have a plurality of spaced apart elastic loops which will be secured to the ends of the web-like structure, the loops providing a means of wrapping and securing the utility device around trees and the loops engaging hooks secured to one side of said device.

Still another object of this invention is to provide a utility device which may also be worn as a wrap-around garment which will be water-proof and will also give the hunter plenty of protection against the wind when secured to trees or other objects and is of such width so that when upright it is short enough to be seen over and is also tall enough to shoot over.

Other objects of this invention are to provide a combination utility device for hunters which is simple in design, inexpensive to manufacture, rugged in construction, easy to use and efficient in operation.

Figure 1:
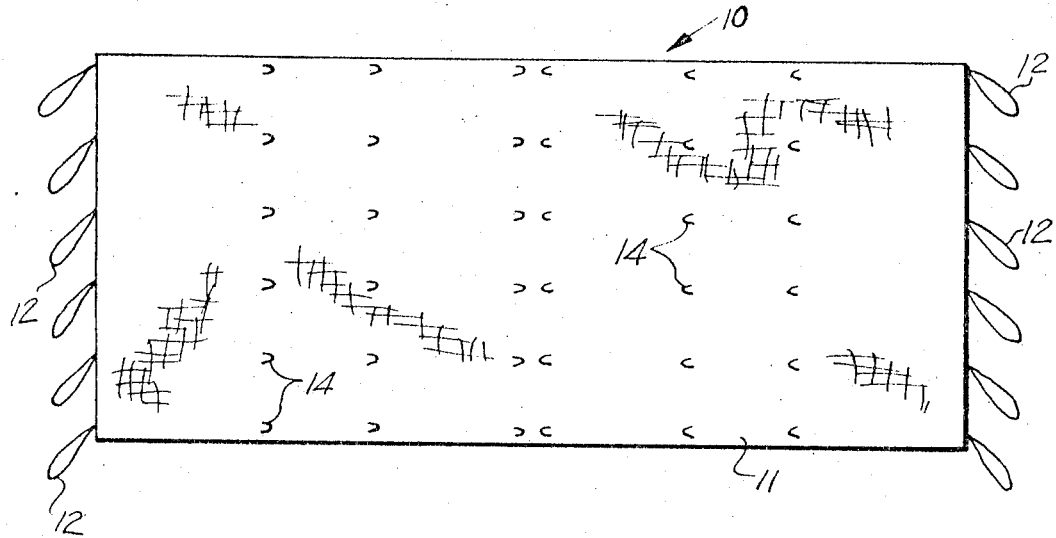
Figure 2:
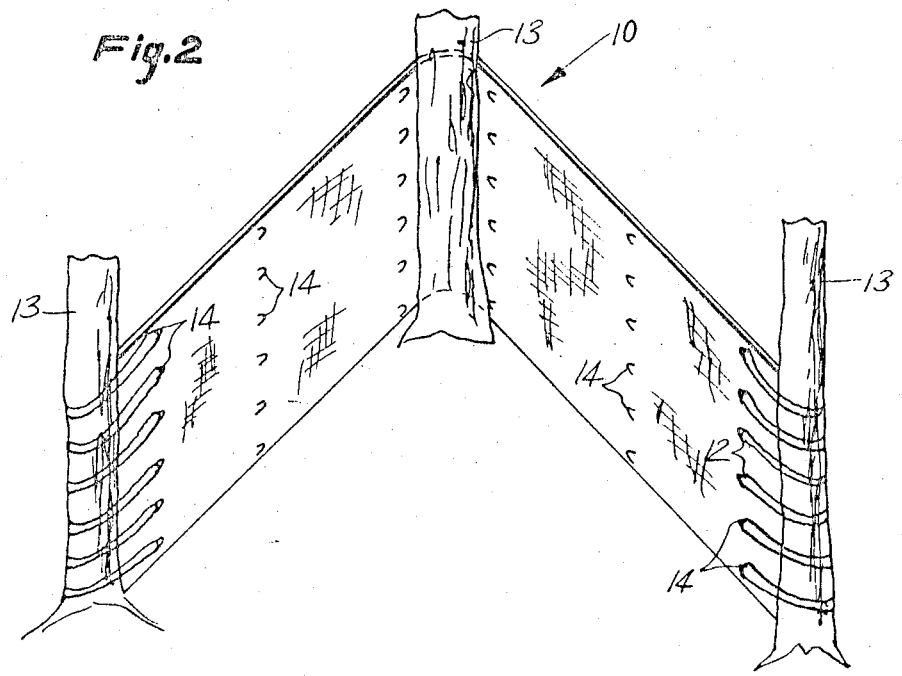

These and other objects will be readily evident upon a study of the following specification together with the accompanying drawing wherein:

FIGURE 1 is a plan view of the present invention; and
FIGURE 2 is a perspective view of the invention shown in use.

According to this invention, a combination utility device 10 for hunters and the like is provided with a rectangular light-weight nylon panel 11 having a plurality of spaced apart elastic loops 12 secured to each end. The loops 12 may be stretched around trees 13 and then engaged with the aligned hooks 14 which are secured to one side of device 10. It is to be noted that the hooks are arranged in a plurality of vertical rows, the rows extending completely across the entire panel 11, the hooks on each one-half end of the panel being turned to associate with the loops 12 secured to the edge of this particular one-half end of the panel.

In use, utility device 10 when used as a windbreaker is spread out around a few trees and the user stretches, one by one, the loops 12 around the trunk of the tree 13, and then engages the loops with the U-shaped and projecting hooks 14 which will secure the ends of the device 10.

What I now claim is:
1. A combination utility device for hunters and the like, comprising in combination, an elongated flexible nylon panel, a plurality of nylon elastic loops carried by said panel providing securement means for the ends around vertical objects, a plurality of spaced apart, U-shaped hooks carried by said panel providing engagement means for said loops, said panel having said loops secured to each end edge and said loops providing a means for securing each end to said object by stretching said elastic loops around said object and then engaging said loops with said U-shaped hooks, thus securing said panel to said object, said loops and said U-shaped hooks being secured stationarily to said panel, said hooks being arranged in a plurality of vertical rows completely across the entire panel, and said hooks on each one-half end of said panel being turned to associate with the loops secured to the particular edge of the one-half end of said panel.

References Cited

UNITED STATES PATENTS

| | | | |
|---|---|---|---|
| 2,168,913 | 8/1939 | Middleton | 135—1 |
| 2,196,704 | 4/1940 | Markle | 135—5 |
| 2,705,966 | 4/1955 | Magary | 135—1 |
| 2,882,913 | 4/1959 | Beauregard | 135—5 |
| 2,991,841 | 7/1961 | Sampson et al. | 182—139 |

PETER M. CAUN, *Primary Examiner.*